D. Kidder,
Fish Hook,
Nº 69,221.    Patented Sept. 24, 1867.
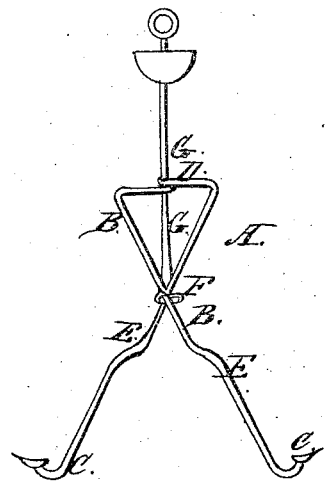
Witnesses;
Theo. Tusche,
J. A. Service.
Inventor;
D. Kidder,
Per Munn & Co.
Attorneys

United States Patent Office.

DANIEL KIDDER, OF FRANKLIN, NEW HAMPSHIRE.

Letters Patent No. 69,221, dated September 24, 1867.

IMPROVEMENT IN SPRING FISH-HOOKS.

*The Schedule referred to in these Letters Patent and making part of the same.*

TO ALL WHOM IT MAY CONCERN:

Be it known that I, DANIEL KIDDER, of Franklin, in the county of Merrimack, and State of New Hampshire, have invented a new and improved "Fish-Hook;" and I do hereby declare that the following is a full, clear, and exact description thereof, which will enable others skilled in the art to make and use the same, reference being had to the accompanying drawings, forming part of this specification.

The fish-hook embraced in the present invention is made from a single wire, bent at such an angle that, by a clasp arranged thereon, and to which the line is hung, the two hook ends of the wire can be brought together, and there be so set that, with a slight pull by a fish upon the hook, they will be disengaged, and made to spread apart, either to a greater or lesser extent, according to the weight or force which may be thus upon them, whereby they are pushed into the mouth of the fish, and made to more firmly grasp and embed themselves therein.

In the accompanying plate of drawings my improved "fish-hook" is illustrated, the figure being a side view of the same with the hooks opened from each other.

A, in the drawings, represents my improved fish-hook. This fish-hook is made of a single piece of wire, B, with a hook, C, at each end, eye D at its centre point, and bent so that the stem or shank portions E to each hook will cross each other, as shown in the drawings. F, a clasp, arranged upon, and to slide over, the two hook-shanks E. This clasp is at one end of a stem, G, that passes through the eye D of the wire B, and to its other end has the line secured in any suitable manner.

By sliding the clasp F down toward the hook ends of the wire B, the two hooks are brought together, the one alongside of the other, where, by the bends of the shanks E in such wire, the clasp is caused to retain them, but with such a slight hold as to be released with the least pull by a fish. Thus the hooks are set free to swing or fly apart, which is increased in greater degree by the weight or force exerted upon the hooks by the fish, from the fact that the hook-shanks, being pulled down through the clasp, cause such clasp to act upon the reverse angle of the said shanks or stems, which, as is obvious, serves to throw them all the further apart, embedding themselves more fully and strongly in the mouth of the fish.

I claim as new, and desire to secure by Letters Patent—

The fish-hook constructed as described, consisting of the single piece of wire B, bent at its centre to form the eye D, sliding upon the stem G, its bent shanks E, (provided at each end with the hooks C,) crossing each other, and held in position by means of the clasp F upon the end of the stem G, all operating as herein set forth for the purpose specified.

DANIEL KIDDER.

Witnesses:
GEORGE L. SANBORN,
N. H. SANBORN.